US012501171B2

(12) United States Patent
Shin

(10) Patent No.: US 12,501,171 B2
(45) Date of Patent: Dec. 16, 2025

(54) IMAGE CAPTURING METHOD AND ELECTRONIC DEVICE FOR CAPTURING IMAGES USING DIFFERENT LIGHT EMISSIONS

(71) Applicant: Samsung Electronics Co., Ltd., Suwon-si (KR)

(72) Inventor: Jongkeun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 18/448,504

(22) Filed: Aug. 11, 2023

(65) Prior Publication Data
US 2023/0396889 A1    Dec. 7, 2023

Related U.S. Application Data

(63) Continuation of application No. PCT/KR2022/000170, filed on Jan. 5, 2022.

(30) Foreign Application Priority Data

Mar. 25, 2021 (KR) .................. 10-2021-0038984

(51) Int. Cl.
*H04N 23/74* (2023.01)
*H04N 23/61* (2023.01)
(Continued)

(52) U.S. Cl.
CPC ............. *H04N 23/74* (2023.01); *H04N 23/61* (2023.01); *H04N 23/632* (2023.01);
(Continued)

(58) Field of Classification Search
CPC ...... H04N 23/74; H04N 23/61; H04N 23/632; H04N 23/667; H04N 23/71; H04N 23/95;
(Continued)

(56) References Cited

U.S. PATENT DOCUMENTS 6,047,138 A * 4/2000 Teremy .................. G03B 15/05
396/157
2008/0043122 A1    2/2008 Steinberg et al.
(Continued)

FOREIGN PATENT DOCUMENTS

JP    H10123408 A    5/1998
JP    2001154245 A    6/2001
(Continued)

OTHER PUBLICATIONS

Extended European Search Report dated Aug. 21, 2024 issued in European Patent Application No. 22775874.5.
(Continued)

*Primary Examiner* — Usman A Khan
(74) *Attorney, Agent, or Firm* — Nixon & Vanderhye P.C.

(57) ABSTRACT

An electronic device according to an embodiment disclosed herein comprises: a camera; a sensor configured to sense the distance between the electronic device and an object; a display; a light-emitting module comprising circuitry configured to generate a flash corresponding to a first light emission and/or a second light emission when capturing an image using the camera; and at least one processor electrically connected to the camera, the sensor, the light-emitting module, and the display. The at least one processor is configured to: control the display to display an image obtained by driving the camera as a preview image on the display; determine a main object included in the preview image; execute a first mode based on the distance between the main object and the electronic device as sensed through the sensor being less than a threshold value, the first mode being a mode for image capture using the first light emission; and executing a second mode based on the distance between the main object and the electronic device as sensed through the sensor being equal to or greater than the threshold value, the second mode being a mode for image capture
(Continued)

using the first light emission and the second light emission occurring subsequent to the first light emission.

20 Claims, 8 Drawing Sheets

(51) Int. Cl.
  *H04N 23/63* (2023.01)
  *H04N 23/667* (2023.01)
  *H04N 23/71* (2023.01)
  *H04N 23/95* (2023.01)

(52) U.S. Cl.
  CPC .......... *H04N 23/667* (2023.01); *H04N 23/71* (2023.01); *H04N 23/95* (2023.01)

(58) Field of Classification Search
  CPC .. H04N 23/611; H04N 23/959; H04N 23/741; H04N 23/56
  USPC ....................................................... 348/207.99
  See application file for complete search history.

(56) References Cited

U.S. PATENT DOCUMENTS

| | | | | |
|---|---|---|---|---|
| 2008/0193119 A1* | 8/2008 | Miyazaki | ............. | H04N 23/611 |
| | | | | 396/164 |
| 2009/0208198 A1* | 8/2009 | Khuntia | ................ | G03B 17/18 |
| | | | | 396/174 |
| 2010/0317398 A1* | 12/2010 | Thorn | .................... | G03B 15/02 |
| | | | | 348/E5.029 |
| 2011/0115941 A1 | 5/2011 | Kim et al. | | |
| 2012/0162481 A1* | 6/2012 | Kim | ..................... | H04N 1/2112 |
| | | | | 348/240.1 |
| 2013/0057740 A1* | 3/2013 | Takaiwa | ............... | H04N 25/704 |
| | | | | 348/297 |
| 2015/0237243 A1 | 8/2015 | Suzuki et al. | | |
| 2018/0063403 A1* | 3/2018 | Ryu | ......................... | G06T 7/70 |
| 2018/0084178 A1* | 3/2018 | Tomar | .................... | H04N 23/71 |
| 2018/0260941 A1* | 9/2018 | Ma | ............................. | G06T 5/50 |
| 2019/0080508 A1 | 3/2019 | Johnson et al. | | |
| 2019/0138259 A1* | 5/2019 | Bagaria | ................. | G06F 3/1454 |
| 2020/0154041 A1* | 5/2020 | Chang | .................... | H04N 23/45 |
| 2021/0368093 A1 | 11/2021 | Lee | | |
| 2022/0141374 A1* | 5/2022 | Sharma | .................. | H04N 23/56 |
| | | | | 348/222.1 |
| 2022/0159168 A1* | 5/2022 | Yu | .......................... | H04N 23/71 |
| 2023/0080972 A1* | 3/2023 | Kojima | ................ | G06V 10/141 |
| | | | | 382/148 |
| 2023/0396889 A1* | 12/2023 | Shin | ...................... | H04N 23/632 |

FOREIGN PATENT DOCUMENTS

| | | | |
|---|---|---|---|
| JP | 2005308929 A | | 11/2005 |
| JP | 2006287967 A | | 10/2006 |
| JP | 2012060439 A | | 3/2012 |
| JP | 2013242441 A | | 12/2013 |
| KR | 20080090022 A | | 10/2008 |
| KR | 20090083595 A | | 8/2009 |
| KR | 10-2012-0071968 | | 7/2012 |
| KR | 20120071968 A | | 7/2012 |
| KR | 10-2016-0031173 | | 3/2016 |
| KR | 20160031173 A | * | 3/2016 |
| KR | 101716282 B1 | | 3/2017 |
| KR | 20180023785 A | | 3/2018 |
| KR | 102439502 B1 | | 9/2022 |
| WO | 2021/025285 | | 2/2021 |

OTHER PUBLICATIONS

International Search Report for PCT/KR2022/000170 mailed May 2, 2022, 4 pages.
Written Opinion of the ISA for PCT/KR2022/000170 mailed May 2, 2022, 4 pages.
Korean Office Action issued Dec. 30, 2024 in corresponding Korean Patent Application No. 10-2021-0038984.
Korean Notice of Patent Grant dated Jul. 30, 2025 for KR Application No. 10-2021-0038984.

* cited by examiner

IMAGE CAPTURING METHOD AND ELECTRONIC DEVICE FOR CAPTURING IMAGES USING DIFFERENT LIGHT EMISSIONS

CROSS-REFERENCE TO RELATED APPLICATIONS

This application is a continuation of International Application No. PCT/KR2022/000170 designating the United States, filed on Jan. 5, 2022, in the Korean Intellectual Property Receiving Office and claiming priority to Korean Patent Application No. 10-2021-0038984, filed on Mar. 25, 2021, in the Korean Intellectual Property Office, the disclosures of which are incorporated by reference herein in their entireties.

BACKGROUND

Field

The disclosure relates to a technology for selecting an image capturing method, based on analysis of a preview image.

Description of Related Art

When shooting a subject using a camera, etc., an image capturing state is determined according to a luminance state of the surrounding environment. When taking a picture indoors or at night, since the ambient luminance is very low, a flash device arbitrarily generating during a very short time a flash of light having almost the same properties as the sun's rays having a high light intensity and a high color temperature is used to be able to improve the ambient luminance at the time of taking a picture, to take a picture with a proper exposure.

At this time, the camera performs image capture using auxiliary light emission and/or main light emission. The auxiliary light emission captures an image with a low brightness using a low current compared to the main light emission, and the main light emission captures an image with a high brightness for a short time using a strong current. The reason of dividing the auxiliary light emission and the main light emission and capturing the image is that the main light emission cannot turn on a flash for a long time because using the strong current, and maintains light emission only for a short time because of severe glare.

On the other hand, when capturing an image with a flash of a camera, an exposure level and a focus cannot be predicted during a very short time of light emission, so an exposure level and a focus of main light emission can be predicted in advance through auxiliary light emission. At this time, if all of the auxiliary light emission and the main light emission are always used, a flash image capture time may increase due to two flash image captures, and a glare phenomenon may occur. Also, since the main light emission emits light during a very short time, a red-eye phenomenon may appear due to insufficient adaptation time of user's eyes.

A technical problem to be addressed in the present disclosure is not limited to the technical problem mentioned above, and other technical problems not mentioned can be clearly understood by those skilled in the art from the description below.

SUMMARY

An electronic device according to an example embodiment may include: a camera, a sensor configured to detect a distance between the electronic device and an object, a display, a light-emitting module including light emitting circuitry configured to provide a flash corresponding to first light emission and/or second light emission based on capturing an image using the camera, and at least one processor electrically connected to the camera, the sensor, the light-emitting module, and the display. The at least one processor may be configured to: control the display to display an image acquired by driving the camera as a preview image on the display, determine a main object included in the preview image, execute a first mode for image capture using the first light emission based on a distance between the main object and the electronic device, detected through the sensor, being less than a threshold value, and execute a second mode for image capture using the first light emission and the second light emission subsequent to the first light emission based on the distance between the main object and the electronic device, detected through the sensor, being greater than or equal to the threshold value.

A method of operating an electronic device according to an example embodiment may include: displaying an image acquired by driving a camera as a preview image on a display, determining a main object included in the preview image, executing a first mode for image capture using first light emission based on a distance between the main object and the electronic device, detected through a sensor, being less than a threshold value, and executing a second mode for image capture using the first light emission and second light emission subsequent to the first light emission based on the distance between the main object and the electronic device, detected through the sensor, being greater than or equal to the threshold value.

An electronic device according to an example embodiment may include: a camera, a sensor configured to detect a distance between the electronic device and an object, a display, a light-emitting module including light emitting circuitry configured to provide a flash corresponding to first light emission and/or second light emission at the time of capturing an image using the camera, and at least one processor electrically connected to the camera, the sensor, the light-emitting module, and the display. The at least one processor may be configured to: control the display to display an image acquired by driving the camera as a preview image on the display, distinguish the preview image into a plurality of regions, determine at least some of the plurality of regions as a foreground region based on distance information between an external object and the electronic device acquired through the sensor, determine a main object included in the foreground region, execute a first mode for image capture using the first light emission based on a distance between the main object and the electronic device, detected through the sensor, being less than a threshold value, and execute a second mode for image capture using the first light emission and second light emission subsequent to the first light emission based on the distance between the main object and the electronic device, detected through the sensor, being greater than or equal to the threshold value.

An electronic device and method of various example embodiments of the present disclosure may reduce an image capture time and mitigate a red-eye phenomenon, by analyzing a preview image and selecting an image capturing method.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used for the same or similar components.

DETAILED DESCRIPTION

Figure 1:
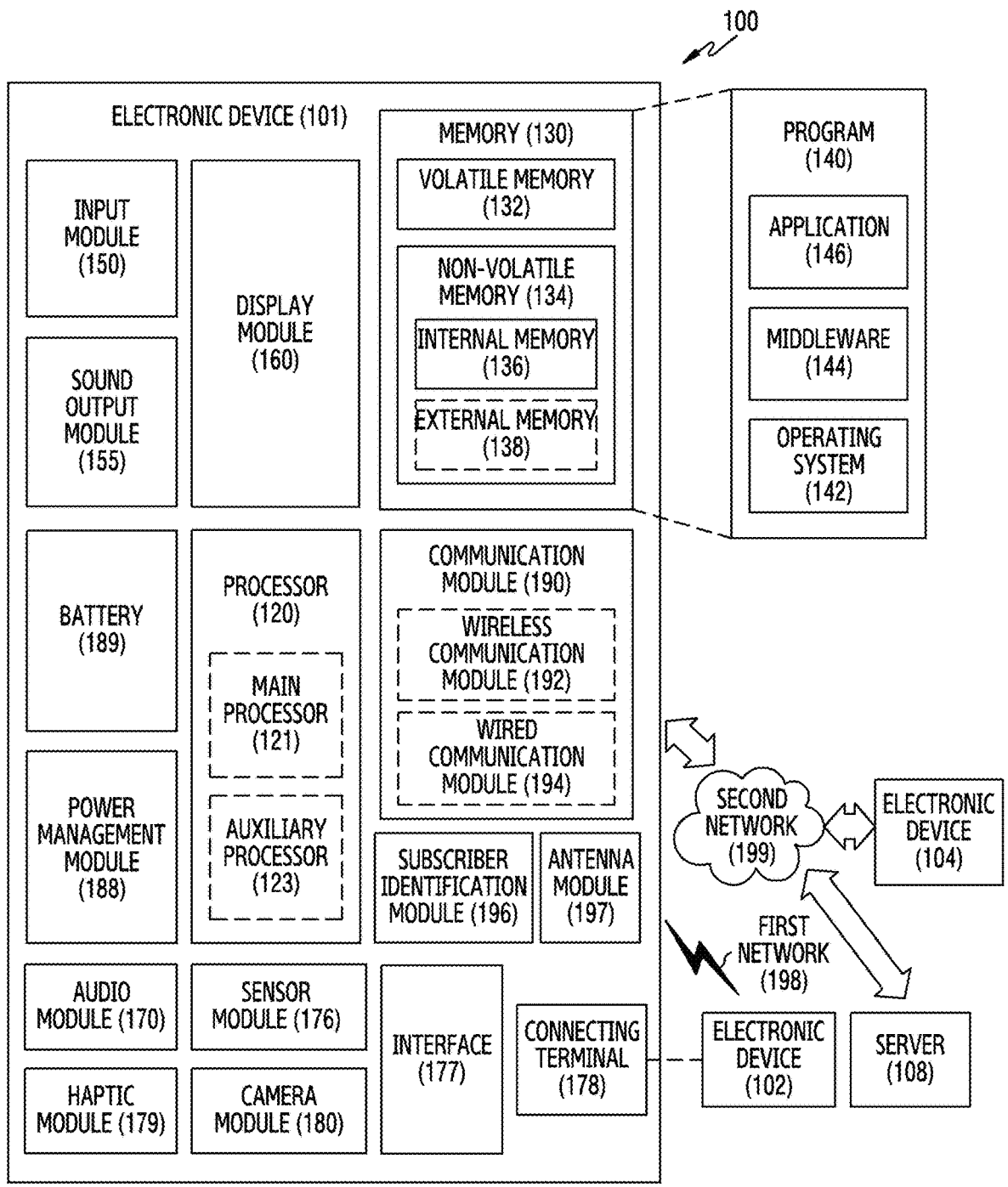
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Figure 2:
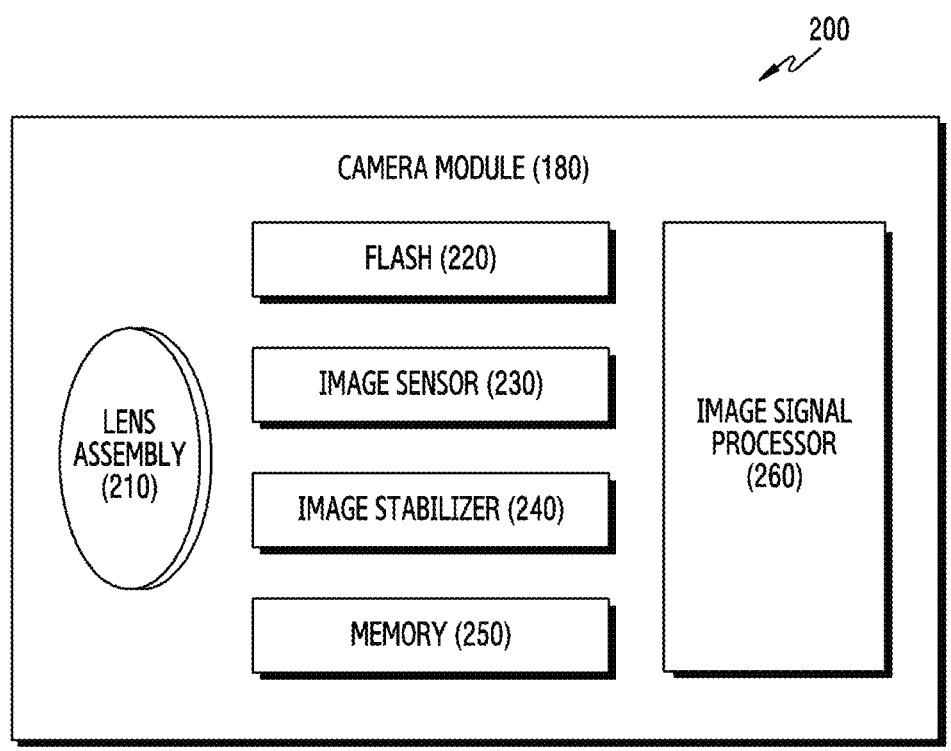
FIG. 2 is a block diagram illustrating an example configuration of a camera module according to various embodiments.

FIG. 2 is a block diagram 200 illustrating an example configuration of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor (e.g., including image signal processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may include various circuitry and move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various processing circuitry and perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
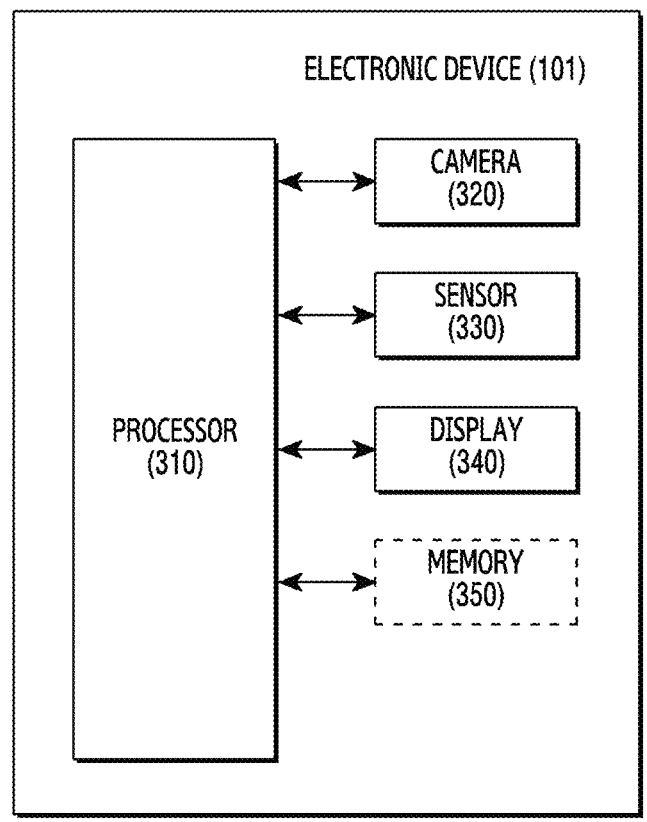
FIG. 3 is a block diagram illustrating an example configuration of an electronic device according to various embodiments.

FIG. 3 is a block diagram illustrating an example configuration of an electronic device according to various embodiments.

Referring to FIG. 3, the electronic device 101 may include a processor (e.g., including processing circuitry) 310, a camera 320, a sensor 330, a display 340, and a memory 350. In various embodiments, the electronic device 101 may include additional components other than those shown in FIG. 3, or may omit at least one of the components shown in FIG. 3.

According to an embodiment, the processor 310 may include various processing circuitry and execute operations or data processing related to control and/or communication of at least one other component of the electronic device 101 using instructions stored in the memory 350. According to an embodiment, the processor 310 may include at least one of a central processing unit (CPU), a graphics processing unit (GPU), a micro controller unit (MCU), a sensor hub, a supplementary processor, a communication processor, an application processor, an application specific integrated circuit (ASIC), and field programmable gate arrays (FPGA), and may have a plurality of cores.

According to an embodiment, the processor 310 may execute an application (e.g., a camera application) stored in the memory 350. According to an embodiment, the processor 310 may acquire an image using the camera 320, in a state where the camera application is running An application according to the disclosure may be any application that uses the camera 320.

According to an embodiment, the processor 310 may display an image acquired using the camera 320 as a preview image on the display 340. According to an embodiment, the processor 310 may acquire distance information to an object included in the preview image using the sensor 330. According to an embodiment, the processor 310 may divide the preview image into a plurality of regions, based on a depth map of the preview image, and perform image processing for each region. Operation of the processor 310 will be described in greater detail below with reference to FIG. 4.

According to an embodiment, the camera 320 may acquire (or capture) an image (e.g., a still image and/or a moving image). For example, an image signal processor (not shown) electrically connected to the camera 320 may distinguish an object (e.g., person) and a background which are included in an image (e.g., preview image, or image stored in the memory 350). According to an embodiment, the image signal processor may be separated from the camera 320, or be implemented as part of the processor 310. According to an embodiment, the camera 320 may include an image sensor. According to an embodiment, the image sensor may acquire and process color information.

According to an embodiment, the sensor 330 may include at least one of a depth sensor, a ToF (e.g., time of flight) sensor, and an image sensor (e.g., a dual pixel image). According to an embodiment, the depth sensor may measure the depth of an external object, and provide depth information corresponding to the external object using the measured depth. According to an embodiment, the sensor 330 may be operatively connected to at least one of the processor 310, the camera 320, and the memory 350, and process color information, 3D information, distance information, location information, and the like.

The display 340 of an embodiment may display an image acquired through the camera 320. According to an embodiment, the processor 310 may display an image acquired through the camera 320 as a preview image on the display 340. For example, the processor 310 may display at least a part of an image acquired through the camera 320, on the display 340 as a preview. According to an embodiment, the electronic device 101 may acquire a user's input through the display 340, and may deliver the user's input to the processor 310.

According to an embodiment, the memory 350 may refer, for example, to one or more memory sets. According to an embodiment, the memory 350 may store data and/or instructions received from other components (e.g., the processor 310, the camera 320, the sensor 330, and the display 340) or provided by other components. In various embodiments, the memory 350 may store applications that use the camera 320.

Figure 4:
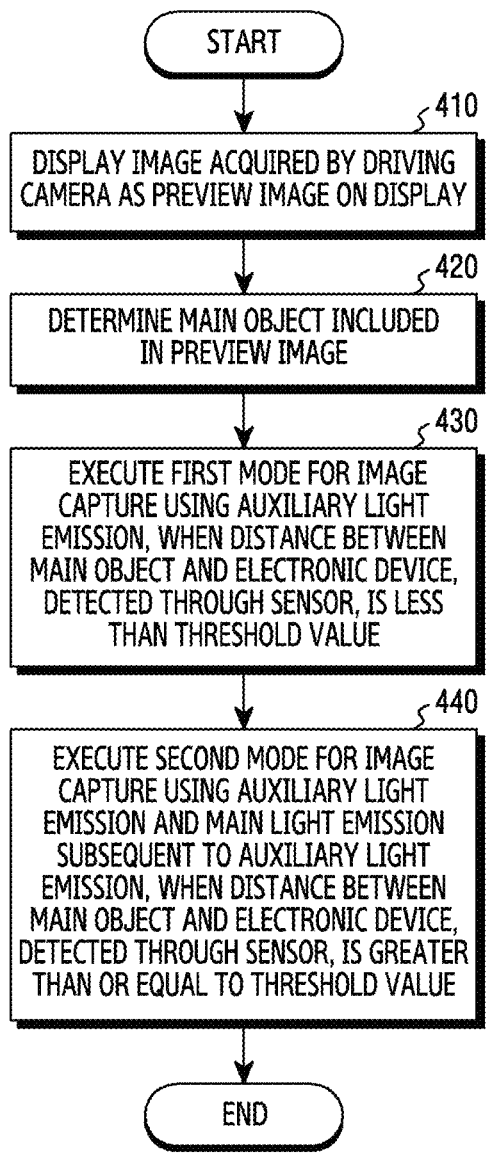
FIG. 4 is a flowchart illustrating an example operation of determining an image capturing method, based on a distance to a subject in an electronic device according to various embodiments.

FIG. 4 is a flowchart illustrating an example operation of determining an image capturing method, based on a distance to a subject in an electronic device according to various embodiments.

Referring to FIG. 4, in operation 410, the processor 310 of an embodiment may display an image acquired by driving the camera 320 as a preview image on the display 340. According to an embodiment, the processor 310 may display the preview image of the image acquired through the camera 320, on the display 340, in a state where a camera application stored in the memory 350 is executed.

According to an embodiment, in operation 420, the processor 310 may determine a main object included in the preview image. For example, the processor 310 may determine a main object included in the image corresponding to the preview image displayed on the display 340 in the image acquired by driving the camera 320. According to an embodiment, the processor 310 may acquire depth information and/or distance information on at least one object included in the preview image using the sensor 330 (e.g., depth sensor or ToF sensor). According to an embodiment, the processor 310 may acquire distance information on at least one object included in the preview image using artificial intelligence (AI) and/or a dual pixel image sensor.

According to an embodiment, the processor 310 may divide the preview image into a plurality of regions, based on the acquired depth information and/or distance information. For example, the processor 310 may separate an object closest to the electronic device 101, from a background image, based on the distance information. According to an embodiment, the processor 310 may determine an object closest to the electronic device 101 as a main object. However, the object determined as the main object is not limited thereto.

According to an embodiment, in operation 430, when a distance between the main object and the electronic device 101, detected through the sensor 330, is less than a threshold value, the processor 310 may execute a first mode for image capture using first light emission (e.g., auxiliary light emission). For example, when a distance between an object closest to the electronic device 101 included in the preview image and the electronic device 101 is less than a specified distance, the processor 310 may capture an image using only the first light emission.

According to an embodiment, when capturing an image using the first light emission, the processor 310 may perform an operation of at least one of auto focus (AF), auto white balance (AWB), and auto exposure (AE). According to an embodiment, by performing the above operation, the processor 310 may calculate AF data for focus adjustment, AWB data for white balance adjustment, and AE data for exposure adjustment.

According to an embodiment, when capturing an image using the first light emission, the processor 310 may adjust a focus on a subject (or main object). According to an embodiment, the processor 310 may adjust the focus on the main object using the distance information acquired using the sensor 330 (e.g., ToF sensor).

According to an embodiment, when the distance between the main object and the electronic device 101 is less than the threshold value, the processor 310 may adjust a position of the focus on the main object using an actuator. According to an embodiment, in response to completion of image capture using the first light emission, the processor 310 may inactivate the first light emission.

According to an embodiment, in operation 440, when the distance between the main object and the electronic device 101, detected through the sensor 330, is greater than or equal to the threshold value, the processor 310 may execute a second mode for image capture using the first light emission and second light emission (e.g., main light emission) subsequent to the first light emission. For example, when the distance between the object closest to the electronic device 101 included in the preview image and the electronic device 101 is greater than or equal to the specified distance, the processor 310 may capture an image using the first light emission and the second light emission. According to an embodiment, the amount of the second light emission may be greater than that of the first light emission. According to an embodiment, when capturing an image using the first light emission, the processor 310 may perform at least one of an AF operation, an AWB operation, and an AE operation using AF data for focus adjustment, AWB data for white balance adjustment, or AE data for exposure adjustment. According to an embodiment, in response to completion of image capture using the first light emission, the processor 310 may inactivate the first light emission.

Figure 5:
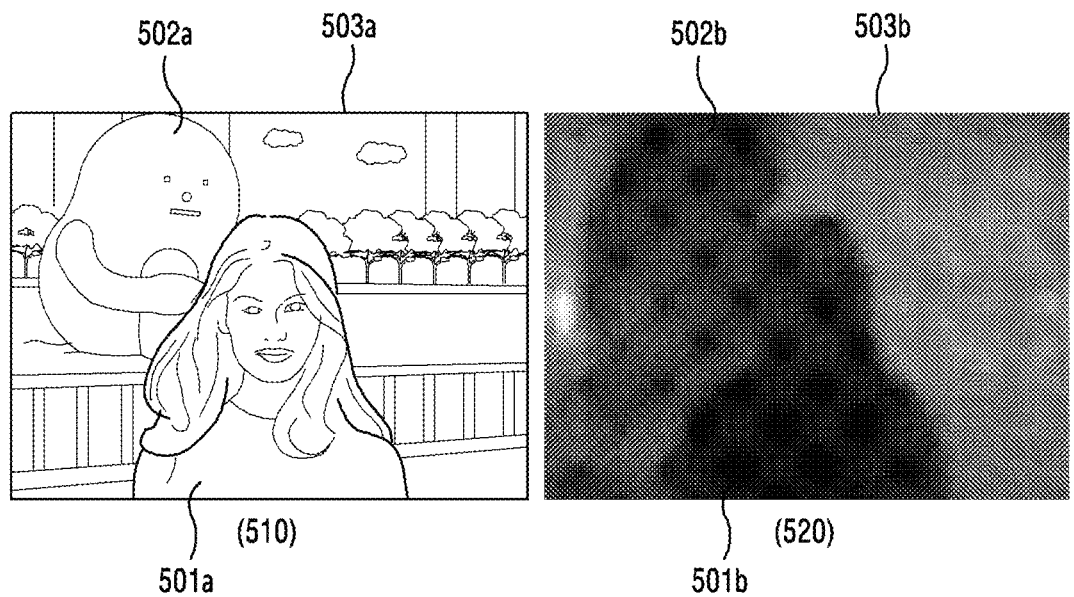
FIG. 5 is a diagram illustrating an example of identifying an object included in a preview image according to distance information in an electronic device according to various embodiments.

FIG. 5 is a diagram illustrating an example of identifying an object included in a preview image according to distance information in an electronic device according to various embodiments.

Referring to FIG. 5, the processor 310 of an embodiment may distinguish an image acquired through the camera 320 into a plurality of regions. For example, the processor 310 may distinguish the image into the plurality of regions, based on depth information and/or distance information of objects included in the image.

According to an embodiment, a preview image 510 displayed on the display 340 may include a plurality of objects. For example, the preview image 510 may include a first object 501*a*, a second object 502*a*, and a third object 503*a*.

According to an embodiment, the processor 310 may provide a depth map 520 corresponding to the preview image 510. According to an embodiment, using the provided depth map, the processor 310 may divide the preview image 510 into a plurality of regions. According to an embodiment, the first object 501*a*, the second object 501*b*, and the third object 501*c* of the preview image 510 may correspond to a first region 501*b*, a second region 502*b*, and a third region 503*b* respectively included in the depth map 520. According to an embodiment, the processor 310 may map numbers to the plurality of regions, based on a depth value acquired for at least one object included in the preview image 510. For example, the processor 310 may map different numbers to the first region 501*b*, the second region 502*b*, and the third region 503*b* included in the depth map 520. Specifically, for example, the processor 310 may map a first number to the first region 501*b* corresponding to the first object 501*a* closest to the electronic device 101, and map a third number larger than the first number to the third region 503*b* corresponding to the third object 503*a* farthest from the electronic device 101. Also, for example, the processor 310 may map a second number larger than the first number and less than the third number, to the second region 502*b* corresponding to the second object 502*a* farther than the first object 501*a* from the electronic device 101 and closer than the third object 503*a*.

Figure 6:
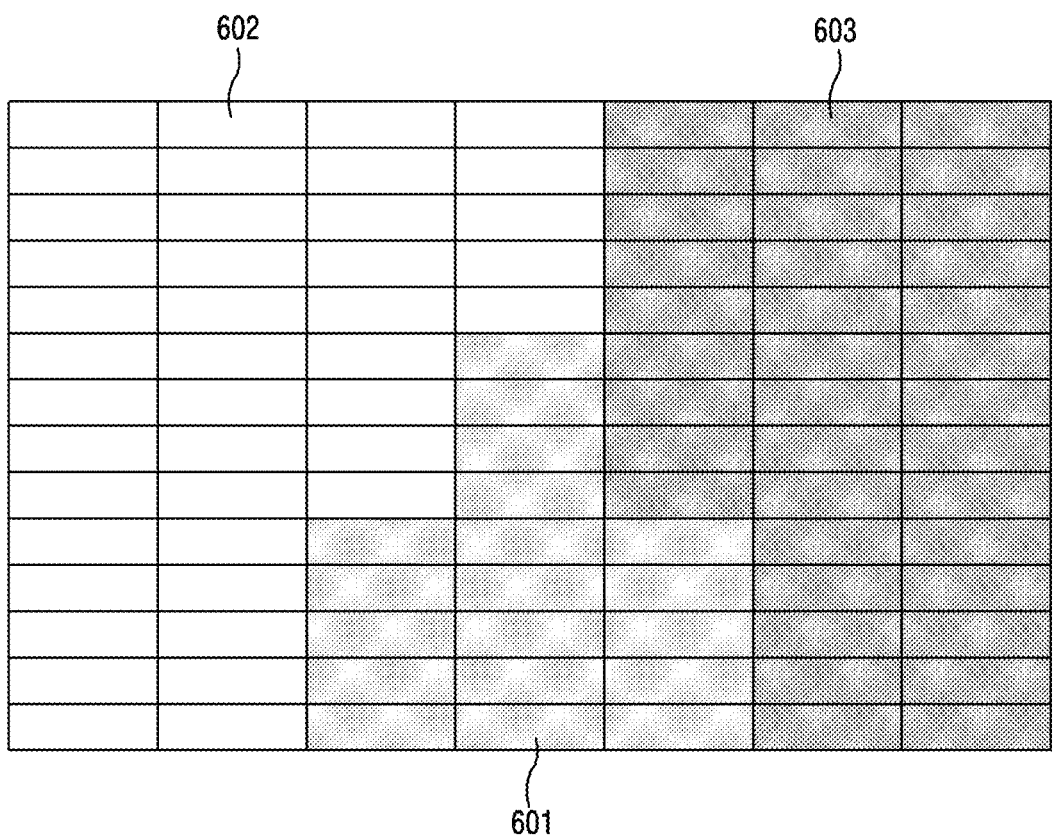
FIG. 6 is a diagram illustrating dividing a preview image into a plurality of regions according to distance information in an electronic device according to various embodiments.

FIG. 6 is a diagram illustrating an example of dividing a preview image into a plurality of regions according to distance information in an electronic device according to various embodiments.

Referring to FIG. 6, according to an embodiment, the processor 310 may distinguish a preview image (e.g., the preview image 510 of FIG. 5) into a foreground region and a rear-ground region, based on depth information and/or distance information detected by the sensor 330 (e.g., depth sensor, ToF sensor). According to an embodiment, the processor 310 may distinguish the preview image 510 into a first region 601 (e.g., foreground region or interested region), a second region 602 (e.g., rear-ground region or background region), and a third region 603 (e.g., rear-ground region or background region), based on the distance information. For example, the processor 310 may determine, as the first region 601, a region corresponding to an object (e.g., the main object of FIG. 4 or the first object 501*a* of FIG. 5) closest to the electronic device 101. Also, for example, the processor 310 may determine, as the third region 603, a region corresponding to an object farthest from the electronic device 101. For example, the processor 310 may determine, as the second region 602, a region other than the first region 610 and the third region 603 of the preview image 510.

According to an embodiment, the processor 310 may acquire brightness information corresponding to the first region 601, the second region 602, and the third region 603 using the sensor 330 (e.g., image sensor). According to an embodiment, the processor 310 may acquire brightness difference information between the foreground region and the rear-ground region. For example, the processor 310 may acquire brightness difference information between the first region 601 and the second region 602. Also, for example, the processor 310 may acquire brightness difference information between the first region 601 and the second region 602.

Figure 7:
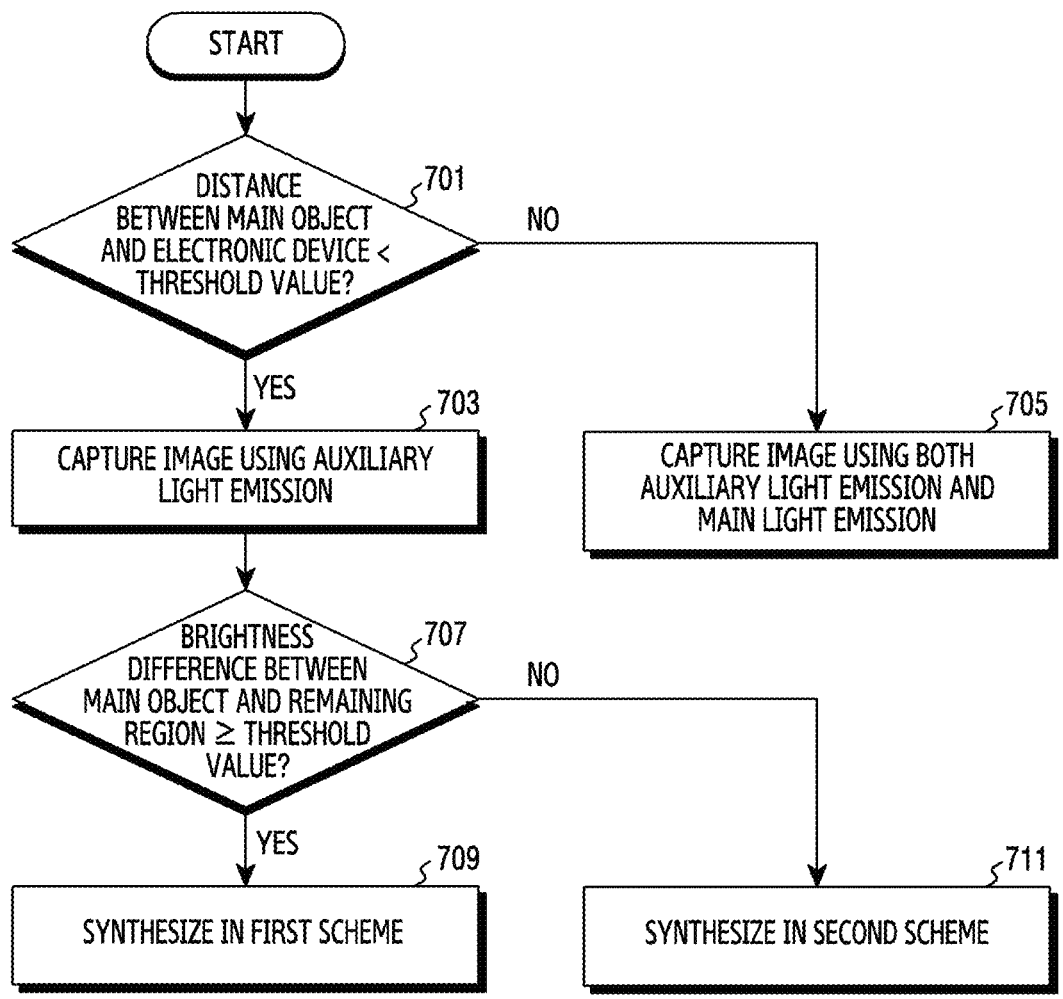
FIG. 7 is a flowchart illustrating an example operation of determining an image capturing mode and a synthesizing scheme, based on distance information and brightness information of a preview image in an electronic device according to various embodiments.

FIG. 7 is a flowchart illustrating an example operation of determining an image capturing mode and a synthesizing scheme, based on distance information and brightness information of a preview image in an electronic device according to various embodiments.

Referring to FIG. 7, in operation 701, the processor 310 of an embodiment may determine whether a distance between a main object and the electronic device 101 is less than a threshold value. According to an embodiment, the processor 310 may acquire distance information between an object closest to the electronic device 101 among objects included in a preview image and the electronic device 101. According to an embodiment, the processor 310 may set an image capturing mode, based on the acquired distance information. For example, the processor 310 may determine whether to perform image capture using only auxiliary light emission, based on the acquired distance information.

According to an embodiment, in operation 703, when it is determined that the distance between the main object and the electronic device 101 is less than the threshold value, the processor 310 may capture an image using the auxiliary light emission. According to an embodiment, when it is determined that the distance between the object closest to the electronic device 101 among the objects included in the preview image and the electronic device 101 is less than a specified distance, the processor 310 may capture an image using only the auxiliary light emission. According to an embodiment, when capturing an image using the auxiliary light emission, the processor 310 may perform at least one of an AF operation, an AWB operation, and an AE operation. According to an embodiment, in response to the end of image capture using the auxiliary light emission, the processor 310 may inactivate the auxiliary light emission.

According to the above-described example, when it is determined that a distance to a subject is short, the electronic device 101 may improve a brightness visibility of the entire image by capturing an image with weak light emission during a long exposure time.

Also, according to the above-described example, when it is determined that the distance to the subject is short, the electronic device 101 may reduce an image capture time and mitigate a red-eye phenomenon by capturing an image using the auxiliary light emission without main light emission.

According to an embodiment, when it is determined that the distance between the main object and the electronic device 101 is greater than or equal to the threshold value, in operation 705, the processor 310 may capture an image using both of the auxiliary light emission and the main light emission. According to an embodiment, when it is determined that the distance between the object closest to the electronic device 101 among the objects included in the preview image and the electronic device 101 is greater than or equal to the specified distance, the processor 310 may capture an image using both of the auxiliary light emission and the main light emission. According to an embodiment, the processor 310 may perform image capture using the main light emission, after completing image capture using the auxiliary light emission.

According to an embodiment, in operation 707, the processor 310 may determine whether a brightness difference between the main object and a remaining region is greater than or equal to a threshold value. According to an embodiment, the processor 310 may acquire brightness information of a region corresponding to the main object (or foreground region) and the remaining region (or rear-ground region) in the preview image using an image sensor. According to an embodiment, the processor 310 may determine whether a difference between a brightness of the foreground region and a brightness of the rear-ground region is greater than or equal to a specified value. According to an embodiment, the processor 310 may determine an exposure time, based on the brightness difference information between the foreground region and the rear-ground region in the preview image.

According to an embodiment, when it is determined that the brightness difference between the foreground region and the rear-ground region is greater than or equal to the threshold value, in operation 709, the processor 310 may synthesize images in a first scheme. According to an embodiment, the processor 310 may determine an image synthesizing scheme, based on the brightness information of the foreground region and/or the rear-ground region. For example, the processor 310 may set an exposure time, based on a brightness of one of the foreground region and the rear-ground region.

According to an embodiment, when it is determined that the brightness difference between the foreground region and the rear-ground region is greater than or equal to the threshold value, the processor 310 may acquire a plurality of images of different brightness from the image sensor.

According to an embodiment, when it is determined that the brightness difference between the foreground region and the rear-ground region is greater than or equal to the threshold value, and the foreground region is bright or saturated, the processor 310 may synthesize an image in which the foreground region is properly exposed among a plurality of images acquired from the image sensor. According to an embodiment, when it is determined that the brightness difference between the foreground region and the rear-ground region is greater than or equal to the threshold value, and the rear-ground region is bright or saturated, the processor 310 may synthesize an image in which the rear-ground region is properly exposed among the plurality of images acquired from the image sensor.

According to an embodiment, when it is determined that the brightness difference between the foreground region and the rear-ground region is greater than or equal to the threshold value, and the foreground region is dark, the processor 310 may synthesize an image in which the foreground region is properly exposed among the plurality of images acquired from the image sensor. According to an embodiment, when it is determined that the brightness difference between the foreground region and the rear-ground region is greater than or equal to the threshold value, and the rear-ground region is dark, the processor 310 may synthesize an image in which the rear-ground region is properly exposed among the plurality of images acquired from the image sensor.

According to an embodiment, when it is determined that the brightness difference between the foreground region and the rear-ground region is greater than or equal to the threshold value, and the foreground region is dark and the rear-ground region is bright, the processor 310 may synthesize an image in which the foreground region is properly exposed and an image in which the rear-ground region is properly exposed. According to an embodiment, when it is determined that the brightness difference between the foreground region and the rear-ground region is greater than or equal to the threshold value, and the foreground region is bright and the rear-ground region is dark, the processor 310 may synthesize an image in which the foreground region is properly exposed and an image in which the rear-ground region is properly exposed.

According to an embodiment, when it is determined that the brightness difference between the main object and the remaining region is less than the threshold value, in operation 711, the processor 310 may synthesize images in a second scheme. According to an embodiment, when it is determined that the brightness difference between the foreground region and the rear-ground region is less than the specified value, the processor 310 may acquire images of the same brightness from the image sensor. According to an embodiment, when it is determined that the brightness difference between the foreground region and the rear-ground region is less than the threshold value, the processor 310 may not synthesize an overexposed or underexposed image among the plurality of images.

According to the above-described example, the electronic device 101 may determine an appropriate synthesizing scheme, based on distance information and/or brightness information acquired from a preview image, thereby improving an image quality.

Figure 8:
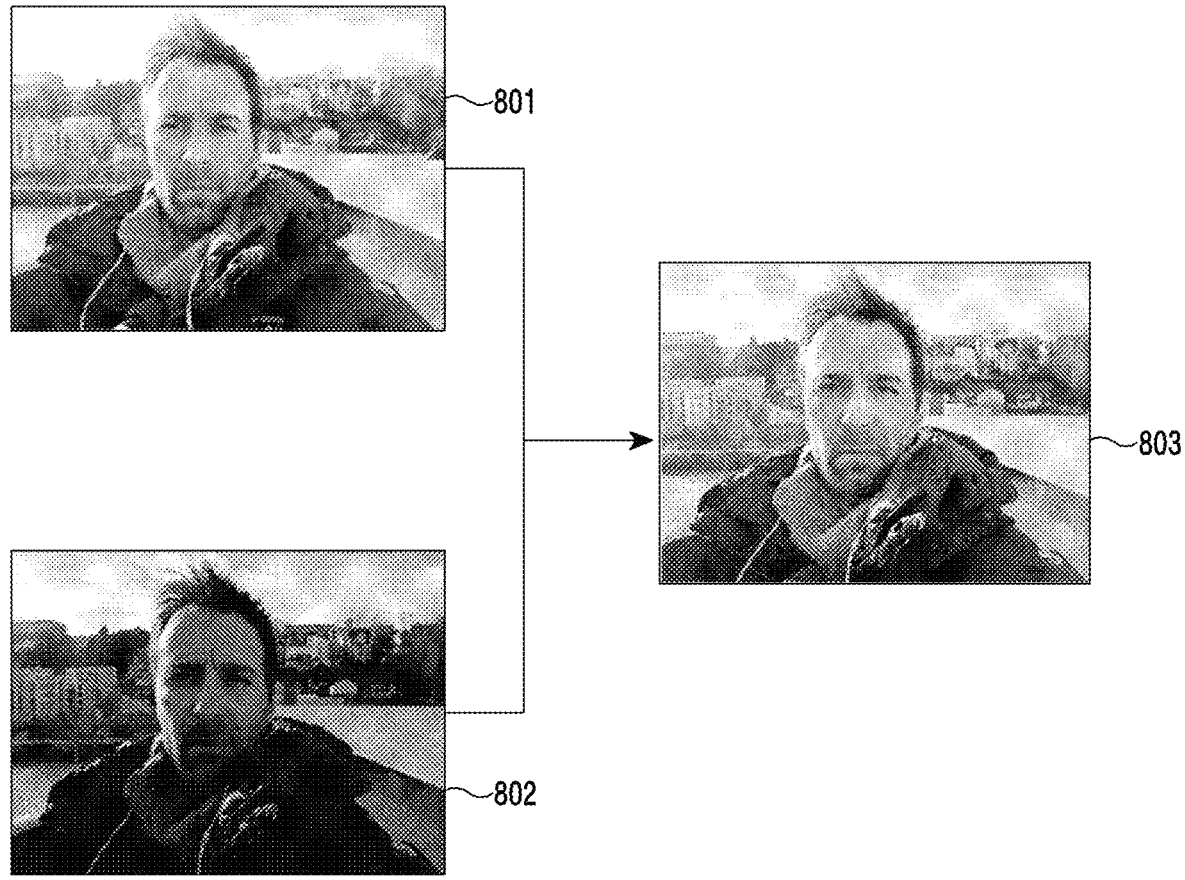
FIG. 8 is a diagram illustrating an example of acquiring an HDR image in an electronic device according to various embodiments.

FIG. 8 is a diagram illustrating an example of acquiring an HDR image in an electronic device according to various embodiments.

Referring to FIG. 8, the processor 310 of an embodiment may provide a synthesized image (or HDR image) using at least some of a plurality of images acquired from an image sensor. According to an embodiment, the processor 310 may provide an HDR image using the plurality of images having different exposure values. According to an embodiment, the processor 310 may provide a third image 803 (e.g., HDR image) using a first image 801 and a second image 802. In the present disclosure, the exposure value may refer, for example, to the amount of exposure, or a brightness of an image.

According to an embodiment, the processor 310 may acquire the plurality of images having the different exposure values from the image sensor. For example, the processor 310 may acquire the first image 801 and the second image 802 from the image sensor. The processor 310 may acquire the first image 801 and the second image 802 having different exposure time of the image sensor.

According to an embodiment, the processor 310 may analyze HDR histograms of the first image 801 and the second image 802. According to an embodiment, a histogram for image brightness shows the amount of exposure as a class and the number of pixels as a frequency, and vice versa. According to an embodiment, by analyzing the histogram of image brightness, the processor 310 may determine the amount of exposure of an acquired image.

According to an embodiment, the processor 310 may determine whether the acquired image has been underexposed or overexposed. According to an embodiment, the processor 310 may analyze the HDR histogram and determine whether the first image 801 or the second image 802 corresponds to at least one of underexposure and overexposure. According to an embodiment, the processor 310 may analyze the HDR histogram and determine underexposure when the number of pixels having an exposure amount smaller than a predetermined exposure amount is large, and determine overexposure when the number of pixels having an exposure amount greater than the predetermined exposure amount is large.

According to an embodiment, pixels of an image may correspond to pixels of an image sensor. According to an embodiment, when the image includes an overexposure region, the processor 310 may acquire an image whose overexposure is mitigated by setting short an exposure time of at least one short-exposure pixel included in the image sensor corresponding to the overexposure region of the image. For example, when it is determined that a rearground region of the first image 801 has been overexposed, the processor 310 may acquire the second image 802 acquired by setting the exposure time short.

According to an embodiment, when the image includes an underexposure region, the processor 310 may acquire an image whose underexposure is mitigated by setting long an exposure time of at least one long-exposure pixel included in the image sensor corresponding to the underexposure region of the image.

According to an embodiment, when the image includes all of the overexposure region and the underexposure region, the processor 310 may acquire all of at least one overexposure-mitigated image included in the image sensor corresponding to the overexposure region and at least one underexposure-mitigated image included in the image sensor corresponding to the underexposure region.

According to an embodiment, the processor 310 may provide an HDR image using an image including an overexposure region and an overexposure-mitigated image. According to an embodiment, the processor 310 may provide an HDR image using an image including an underexposure region and an underexposure-mitigated image. According to an embodiment, the processor 310 may provide an HDR image using all of an image including all of an overexposure region and an underexposure region, an overexposure-mitigated image, and an underexposure-mitigated image.

According to an embodiment, the first image 801 may include an image having an overexposure region, and the second image 802 may include an overexposure-mitigated image. According to an embodiment, the processor 310 the first image 801 may include an image captured wherein a foreground region (or interested region, or region corresponding to a main object) is properly exposed, and the second image 802 may include an image captured wherein a region other than the foreground region is properly exposed. According to an embodiment, the processor 310 may provide a third image 803 (e.g., HDR image) using the first image 801 and the second image 802.

According to various embodiments, each component (e.g., module or program) of the above-described components may include a single entity or a plurality of entities, and some of the plurality of entities may be separately disposed in other components as well. According to various embodiments, one or more components or operations among the aforementioned corresponding components may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component among the plurality of components prior to the integration. According to various embodiments, the operations performed by a module, program, or other component may be executed sequentially, in parallel, iteratively, or heuristically, or one or more of the operations may be executed in a different order, or be omitted, or one or more other operations may be added.

As described above, an electronic device (e.g., the electronic device 101 of FIG. 1) of an example embodiment may include: a camera (e.g., the camera 320 of FIG. 3), a sensor (e.g., the sensor 330 of FIG. 3) configured to detect a distance between the electronic device and an object, a display (e.g., the display 340 of FIG. 3), a light-emitting module including light emitting circuitry configured to provide a flash corresponding to first light emission and/or second light emission when capturing an image using the camera, and at least one processor electrically connected to the camera, the sensor, the light-emitting module, and the display. The at least one processor may be configured to: control the display to display an image acquired by driving the camera as a preview image on the display, determine a main object included in the preview image, execute a first mode for image capture using the first light emission based on a distance between the main object and the electronic device, detected through the sensor, being less than a threshold value, and execute a second mode for image capture using the first light emission and the second light emission subsequent to the first light emission based on the distance between the main object and the electronic device, detected through the sensor, being greater than or equal to the threshold value.

According to an example embodiment, the at least one processor may be configured to inactivate the first light emission in response to completion of image capture using the first light emission.

According to an example embodiment, an amount of the second light emission is greater than an amount of the first light emission.

According to an example embodiment, based on capturing an image using the first light emission, the at least one processor may be configured to perform at least one of an auto focus (AF) operation, an auto white balance (AWB) operation, and an auto exposure (AE) operation.

According to an example embodiment, the at least one processor may be configured to: determine a region corresponding to the main object as a first region, determine a region other than the first region in the preview image as a second region, acquire brightness difference information between the first region and the second region, and determine an exposure time, based on the acquired brightness difference information.

According to an example embodiment, the electronic device may include: an image sensor, and the at least one processor may be configured to: provide a high dynamic range (HDR) image by acquiring a plurality of images of different brightness from the image sensor based on the acquired brightness difference being greater than or equal to a threshold value.

According to an example embodiment, based on determining that the first region or the second region is overexposed, the at least one processor may be configured to provide an HDR image by synthesizing low-exposure images.

According to an example embodiment, the at least one processor may be configured to: divide the preview image into a plurality of regions, distinguish the regions, based on distance information of each of the plurality of regions, and acquire the brightness difference information between the distinguished regions.

As described above, a method of operating an electronic device (e.g., the electronic device 101 of FIG. 1) according to an example embodiment may include: displaying an image acquired by driving a camera (e.g., the camera 320 of FIG. 3) as a preview image on a display (e.g., the display 340 of FIG. 3), determining a main object included in the preview image, executing a first mode for image capture using first light emission based on a distance between the main object and the electronic device, detected through a sensor (e.g., the sensor 330 of FIG. 3), being less than a threshold value, and executing a second mode for image capture using the first light emission and second light emission subsequent to the first light emission based on the distance between the main object and the electronic device, detected through the sensor, being greater than or equal to the threshold value.

The method of operating the electronic device according to an example embodiment may include inactivating the first light emission in response to completion of image capture using the first light emission.

According to an example embodiment, the executing the first mode may include performing at least one of an AF operation, an AWB operation, and an AE operation.

The method of operating the electronic device according to an example embodiment may include: determining a region corresponding to the main object as a first region, determining a region other than the first region in the preview image as a second region, acquiring brightness difference information between the first region and the second region, and determining an exposure time, based on the acquired brightness difference information.

According to an example embodiment, the method of operating the electronic device may include: based on the acquired brightness difference being greater than or equal to a threshold value, providing an HDR image by acquiring a plurality of images of different brightness from the image sensor.

According to an example embodiment, the method of operating the electronic device may include based on determining that the first region or the second region is overexposed, providing an HDR image by synthesizing low-exposure images.

According to an example embodiment, the method of operating the electronic device may include: dividing the preview image into a plurality of regions and distinguishing the regions, based on distance information of each of the plurality of regions, and acquiring the acquired brightness difference information between the distinguished regions.

As described above, an electronic device (e.g., the electronic device 101 of FIG. 1) according to an example embodiment may include: a camera, a sensor configured to detect a distance between the electronic device and an object, a display, a light-emitting module comprising circuitry configured to provide a flash corresponding to first light emission and/or second light emission at the time of capturing an image using the camera, and at least one processor electrically connected to the camera, the sensor, the light-emitting module, and the display. The at least one processor may be configured to: control the display to display an image acquired by driving the camera as a preview image on the display, distinguish the preview image into a plurality of regions, determine at least some of the plurality of regions as a foreground region, based on distance information between an external object and the electronic device acquired through the sensor, determine a main object included in the foreground region, execute a first mode for image capture using the first light emission based on a distance between the main object and the electronic device, detected through the sensor, being less than a threshold value, and execute a second mode for image capture using the first light emission and second light emission subsequent to the first light emission based on the distance between the main object and the electronic device, detected through the sensor, being greater than or equal to the threshold value.

According to an example embodiment, the at least one processor the at least one processor may be configured to acquire the distance information using at least one of artificial intelligence (AI), a dual pixel image sensor, and a time of flight (TOF) sensor.

According to an example embodiment, the at least one processor may be configured to map a number corresponding to distance information of each region, to the foreground region and a region other than the foreground region among the plurality of regions.

According to an example embodiment, the at least one processor may be configured to: acquire brightness difference information between the foreground region and the region other than the foreground region, and determine an exposure time, based on the acquired brightness difference information.

The electronic device according to an example embodiment may include an image sensor, and the at least one processor may be configured to provide an HDR image by acquiring a plurality of images of different brightness from the image sensor based on the acquired brightness difference being greater than or equal to a threshold value.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a camera;

a sensor configured to detect a distance between the electronic device and an object;

a display;

a light-emitting module comprising circuitry configured to provide a flash corresponding to first light emission and/or second light emission when capturing an image using the camera, wherein an amount of light of the second light emission is greater than an amount of light of the first light emission; and at least one processor electrically connected to the camera, the sensor, the light-emitting module, and the display, wherein the at least one processor is configured to:

control the display to display an image acquired by driving the camera as a preview image on the display;

determine a main object in the preview image;

execute a first mode for image capture using a flash including the first light emission based on a distance between the main object and the electronic device, detected through the sensor, being less than a threshold value; and execute a second mode for image capture using a flash including the first light emission and the second light emission subsequent to the first light emission based on the distance between the main object and the electronic device, detected through the sensor, being greater than or equal to the threshold value.

2. The electronic device of claim 1, wherein the at least one processor is configured to inactivate the first light emission in response to completion of image capture using the first light emission.

3. The electronic device of claim 1, wherein the first light emission is inactivated when the second light emission is used in the second mode.

4. The electronic device of claim 1, wherein, based on capturing an image using the first light emission, the at least one processor is configured to perform at least one of an auto focus (AF) operation, an auto white balance (AWB) operation, and an auto exposure (AE) operation.

5. The electronic device of claim 1, wherein the camera comprises an image sensor, and the at least one processor is configured to:

determine a region corresponding to the main object in the preview image as a first region;

determine a region other than the first region in the preview image as a second region;

acquire brightness difference information between the first region and the second region; and determine an exposure time of the image sensor, based on the acquired brightness difference information.

6. The electronic device of claim 5, wherein the at least one processor is configured to:

acquire a plurality of images of different brightness from the image sensor based on the acquired brightness difference being greater than or equal to a threshold value; and provide a high dynamic range (HDR) image, based on the plurality of images.

7. The electronic device of claim 6, wherein, based on determining that the first region or the second region is overexposed, the at least one processor provides an HDR image by synthesizing low-exposure images.

8. The electronic device of claim 5, wherein the at least one processor is configured to: divide the preview image into a plurality of regions, distinguish the regions, based on distance information of each of the plurality of regions, and acquire the brightness difference information between the distinguished regions.

9. A method of operating an electronic device, the method comprising:

displaying an image acquired by driving a camera as a preview image on a display;

determining a main object of the preview image;

executing a first mode for image capture using a flash including first light emission based on a distance between the main object and the electronic device, detected through a sensor, being less than a threshold value; and executing a second mode for image capture using a flash including the first light emission and second light emission subsequent to the first light emission based on the distance between the main object and the electronic device, detected through the sensor, being greater than or equal to the threshold value, wherein an amount of light of the second light emission is greater than an amount of light of the first light emission.

10. The method of operating the electronic device of claim 9, further comprising inactivating the first light emission in response to completion of image capture using the first light emission.

11. The method of operating the electronic device of claim 9, wherein executing the first mode comprises performing at least one of an AF operation, an AWB operation, and an AE operation.

12. The method of operating the electronic device of claim 9, further comprising:

determining a region corresponding to the main object in the preview image as a first region;

determining a region other than the first region in the preview image as a second region;

acquiring brightness difference information between the first region and the second region; and determining an exposure time of an image sensor of the camera, based on the acquired brightness difference information.

13. The method of operating the electronic device of claim 12, further comprising, based on the acquired brightness difference being greater than or equal to a threshold value, providing an HDR image by acquiring a plurality of images of different brightness from the image sensor.

14. The method of operating the electronic device of claim 13, comprising, based on determining that the first region or the second region is overexposed, providing an HDR image by synthesizing low-exposure images.

15. The method of operating the electronic device of claim 12, further comprising:

dividing the preview image into a plurality of regions and distinguishing the regions, based on distance information of each of the plurality of regions; and acquiring the acquired brightness difference information between the distinguished regions.

16. An electronic device comprising:

a camera;

a sensor configured to detect a distance between the electronic device and an object;

a display;

a light-emitting module comprising circuitry configured to provide a flash corresponding to first light emission and/or second light emission at the time of capturing an image by using the camera, wherein an amount of light of the second light emission is greater than an amount of light of the first light emission; and at least one processor electrically connected to the camera, the sensor, the light-emitting module, and the display, wherein the at least one processor is configured to:

control the display to display an image acquired by driving the camera as a preview image on the display;

distinguish the preview image into a plurality of regions;

determine at least some of the plurality of regions as a foreground region, based on distance information between an external object and the electronic device acquired through the sensor;

determine a main object included in the foreground region;

execute a first mode for image capture using a flash including the first light emission based on a distance between the main object and the electronic device, detected through the sensor, being less than a threshold value; and execute a second mode for image capture using a flash including the first light emission and second light emission subsequent to the first light emission based on the distance between the main object and the electronic device, detected through the sensor, being greater than or equal to the threshold value.

17. The electronic device of claim 16, wherein the at least one processor is configured to acquire the distance information using at least one of artificial intelligence (AI), a dual pixel image sensor, and a time of flight (TOF) sensor.

18. The electronic device of claim 16, wherein the at least one processor is configured to map a number corresponding to distance information of each region, to the foreground region and a region other than the foreground region among the plurality of regions.

19. The electronic device of claim 16, wherein the at least one processor is configured to: acquire brightness difference information between the foreground region and the region other than the foreground region, and determine an exposure time, based on the acquired brightness difference information.

20. The electronic device of claim 19, further comprising an image sensor, wherein the at least one processor is configured to provide an HDR image by acquiring a plurality of images of different brightness from the image sensor, based on the acquired brightness difference being greater than or equal to a threshold value.

* * * * *